United States Patent
Okada

(10) Patent No.: US 9,631,408 B2
(45) Date of Patent: Apr. 25, 2017

(54) HINGE STRUCTURE AND IMAGE FORMING APPARATUS INCLUDING THE SAME

(71) Applicant: KYOCERA Document Solutions Inc., Osaka (JP)

(72) Inventor: Takehiko Okada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/087,281

(22) Filed: Mar. 31, 2016

(65) Prior Publication Data

US 2016/0299416 A1    Oct. 13, 2016

(30) Foreign Application Priority Data

Apr. 7, 2015  (JP) ................. 2015-078216

(51) Int. Cl.
*E05D 7/06* (2006.01)
*E05D 7/12* (2006.01)
(Continued)

(52) U.S. Cl.
CPC ............. *E05D 7/12* (2013.01); *E05D 7/04* (2013.01); *E05D 13/123* (2013.01);
(Continued)

(58) Field of Classification Search
CPC ........... Y10T 16/5323; Y10T 16/53834; Y10T 16/53885; Y10T 16/5406; Y10T 16/543; Y10T 16/5448; Y10T 16/5383; H04N 1/00; H04N 1/00543; H04N 1/00554; H04N 1/00519; H04N 2201/0422; E05Y 2900/608; E05Y 2900/606; G03G 15/605;
(Continued)

(56) References Cited

U.S. PATENT DOCUMENTS 4,660,251 A * 4/1987 Watabe ............... E05D 7/04
16/289
4,730,364 A * 3/1988 Tat-Kee ............. E05D 11/1064
16/337
(Continued)

FOREIGN PATENT DOCUMENTS

JP    07054536 A  *  2/1995
JP    08-029892 A     2/1996
(Continued)

*Primary Examiner* — Chuck Mah
(74) *Attorney, Agent, or Firm* — Studebaker & Brackett PC

(57) ABSTRACT

A hinge structure includes an attachment recessed part, an attachment member, a first rotating body and a second rotating body. The attachment recessed part is configured to have inlet and outlet part in an upper part thereof. The attachment member is configured so that an upper end part thereof is pivotably connected to the document cover. The first rotating body is configured to be provided in the apparatus main body so as to come into contact with a side of the document mounting surface of the attachment member in the inlet and outlet part in the attachment recessed part. The second rotating body is configured to be provided in a lower part of the attachment member so as to come into contact with the attachment recessed part at an opposite side of the position in which the first rotating body is provided.

5 Claims, 6 Drawing Sheets

(51) Int. Cl.
*E05D 7/04* (2006.01)
*G03G 15/00* (2006.01)
*H04N 1/00* (2006.01)
*E05D 13/00* (2006.01)
*E05D 3/02* (2006.01)
*B41J 29/02* (2006.01)

(52) U.S. Cl.
CPC ............ *G03G 15/605* (2013.01); *H04N 1/00* (2013.01); *B41J 29/02* (2013.01); *E05D 3/02* (2013.01); *E05Y 2900/60* (2013.01); *E05Y 2900/608* (2013.01)

(58) Field of Classification Search
CPC ...... G03B 27/62; G03B 27/6228; E05D 3/18; E05D 7/04; E05D 7/12; E05D 11/1064
See application file for complete search history.

(56) References Cited

U.S. PATENT DOCUMENTS

| | | | | |
|---|---|---|---|---|
| 6,928,698 | B2* | 8/2005 | Chen | E05D 3/18 16/277 |
| 7,240,401 | B2* | 7/2007 | Tamehira | E05D 11/1064 16/277 |
| 7,299,525 | B2* | 11/2007 | Chang | H04N 1/00543 16/327 |
| 7,418,766 | B2* | 9/2008 | Nelson | E05D 11/1007 16/239 |
| 7,617,568 | B2* | 11/2009 | Jing | E05F 1/1276 16/239 |
| 7,949,292 | B2* | 5/2011 | Choi | H04N 1/00519 16/277 |
| 8,457,527 | B2* | 6/2013 | Takata | G03G 15/605 16/286 |
| 2007/0089271 | A1* | 4/2007 | Jo | E05D 11/1064 16/286 |
| 2010/0014127 | A1* | 1/2010 | Osakabe | H04N 1/00519 358/497 |
| 2014/0023416 | A1* | 1/2014 | Suzuki | H04N 1/00554 399/380 |
| 2014/0137479 | A1* | 5/2014 | Choi | H04N 1/00519 49/386 |
| 2015/0015920 | A1* | 1/2015 | Muraoka | H04N 1/00554 358/400 |
| 2015/0067986 | A1* | 3/2015 | Lee | E05F 1/1261 16/321 |

FOREIGN PATENT DOCUMENTS

| | | | | |
|---|---|---|---|---|
| JP | | 09208098 | A * | 8/1997 |
| JP | | 11294001 | A * | 10/1999 |
| JP | | 2002014496 | A * | 1/2002 |

* cited by examiner

HINGE STRUCTURE AND IMAGE FORMING APPARATUS INCLUDING THE SAME

INCORPORATION BY REFERENCE

This application is based on and claims the benefit of priority from Japanese Patent application No. 2015-078216 filed on Apr. 7, 2015, the entire contents of which are incorporated herein by reference.

BACKGROUND

The present disclosure relates to a hinge structure suitably used for a copying machine, a printer, a scanner and others having a document cover and an image forming apparatus including the hinge structure.

In an image forming apparatus, an auto document feeder (ADF) for ejecting documents that is automatically fed on a platen glass (a document rack) and is subject to an image forming processing is provided. The auto document feeder is openably/closably supported by a hinge structure with respect to a platen glass, and includes a document cover for pressing documents on the platen glass when the hinge structure is closed.

This conventional type of hinge structure is configured such that an attachment member protruded in the document cover is insertably/removably provided in an attachment recessed part formed on an upper surface of the apparatus main body. In addition, in the image forming apparatus including this type of hinge structure, when documents are pressed onto the platen glass by the document cover in order to read out a thick document such as a book or when the auto document feeder is detached in order to carry out a periodical maintenance work, the attachment member is configured to be lifted upwardly along the attachment recessed part. However, in this case, in a case where a heavy load is applied to the hinge structure, particularly, there is a risk that the attachment member is not smoothly lifted up and is strongly rubbed with the attachment recessed part, and consequently defects such as break or deformation of the hinge structure may be generated.

Accordingly, in order to the foregoing problems, for example, an image forming apparatus including a hinge structure in which rollers are attached to upper and lower parts of the attachment member (a hinge foot) and a protrusion for prevention of retaining in a lower part of the attachment member has been proposed.

However, in the hinge structure described above, when the attachment member is lifted upwardly along the attachment recessed part and the upper roller is detached from the attachment recessed part, the attachment member is fallen forward to pry the attachment recessed part, and consequently the attachment member is sometimes not smoothly lifted up. In addition, in a case where a thicker document than defined limited thickness is pressed by the document cover through a user's carelessness, there is a risk that defects such as break or deformation of the hinge structure may be generated.

SUMMARY

In order to achieve the above-mentioned object, in accordance with an embodiment of the present disclosure, a hinge structure includes an attachment recessed part, an attachment member, a first rotating body and a second rotating body. The attachment recessed part is formed downwardly in a position out of the document mounting surface that is the upper surface of the apparatus main body, and configured to have an inlet/outlet part in an upper part thereof. The attachment member is protruded downwardly from the document cover so as to be insertable into and removable from the inlet/outlet part of the attachment recessed part, and configured so that an upper end part thereof is pivotably connected to the document cover. The first rotating body is configured to be provided in the apparatus main body so as to come into contact with a side of the document mounting surface of the attachment member in the inlet/outlet part in the attachment recessed part. The second rotating body is configured to be provided in a lower part of the attachment member so as to come into contact with the attachment recessed part at an opposite side of the position in which the first rotating body is provided.

In accordance with an embodiment of the present disclosure, an image forming apparatus includes the above-mentioned hinge structure.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, an embodiment of the present disclosure will be described with reference to the attached drawings. It is to be noted that, in the following description, for convenience, each direction is defined as shown by arrows in each drawing.

Figure 1:
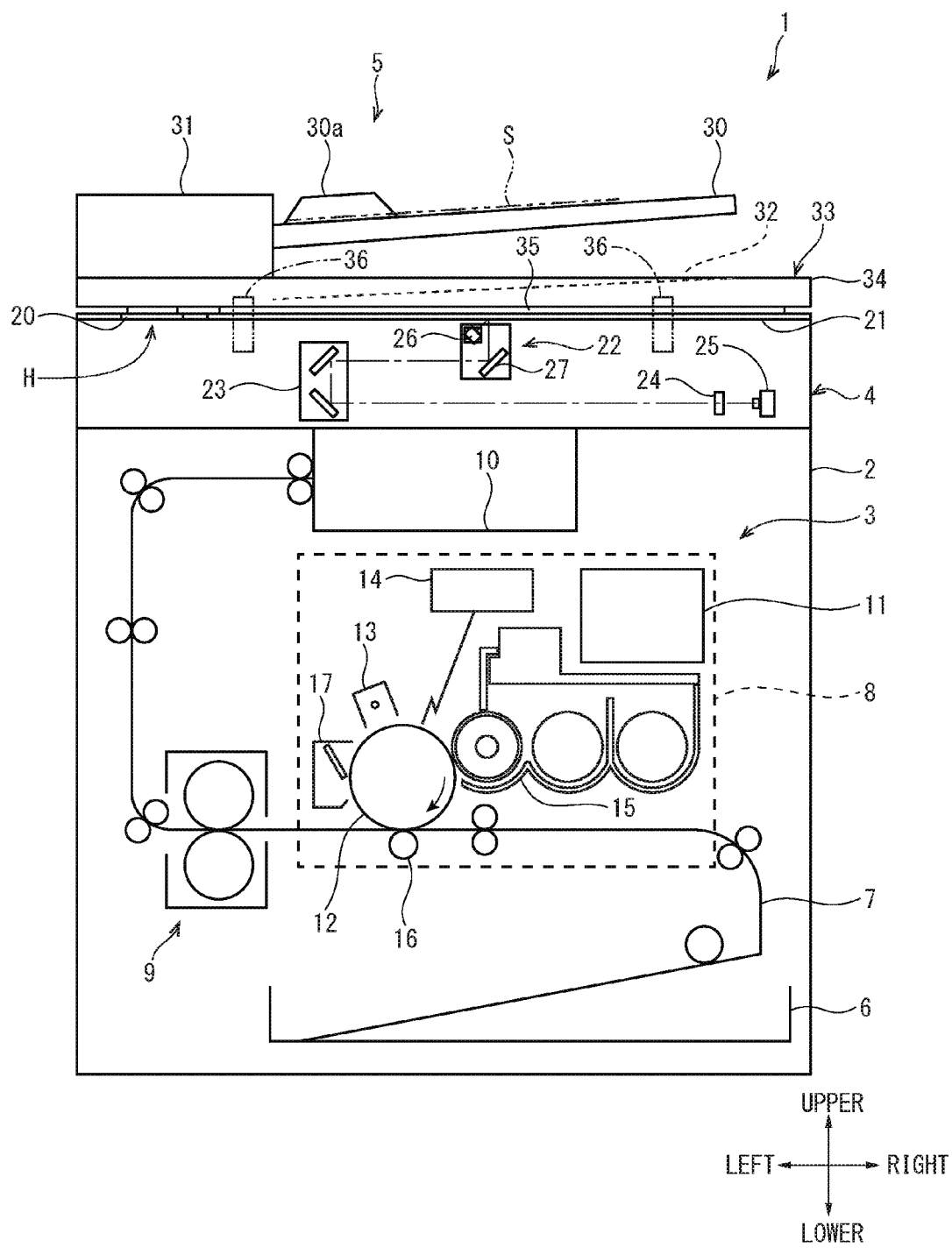
FIG. 1 is a cross sectional view schematically showing a multifunction peripheral according to an embodiment of the present disclosure.
Figure 2:
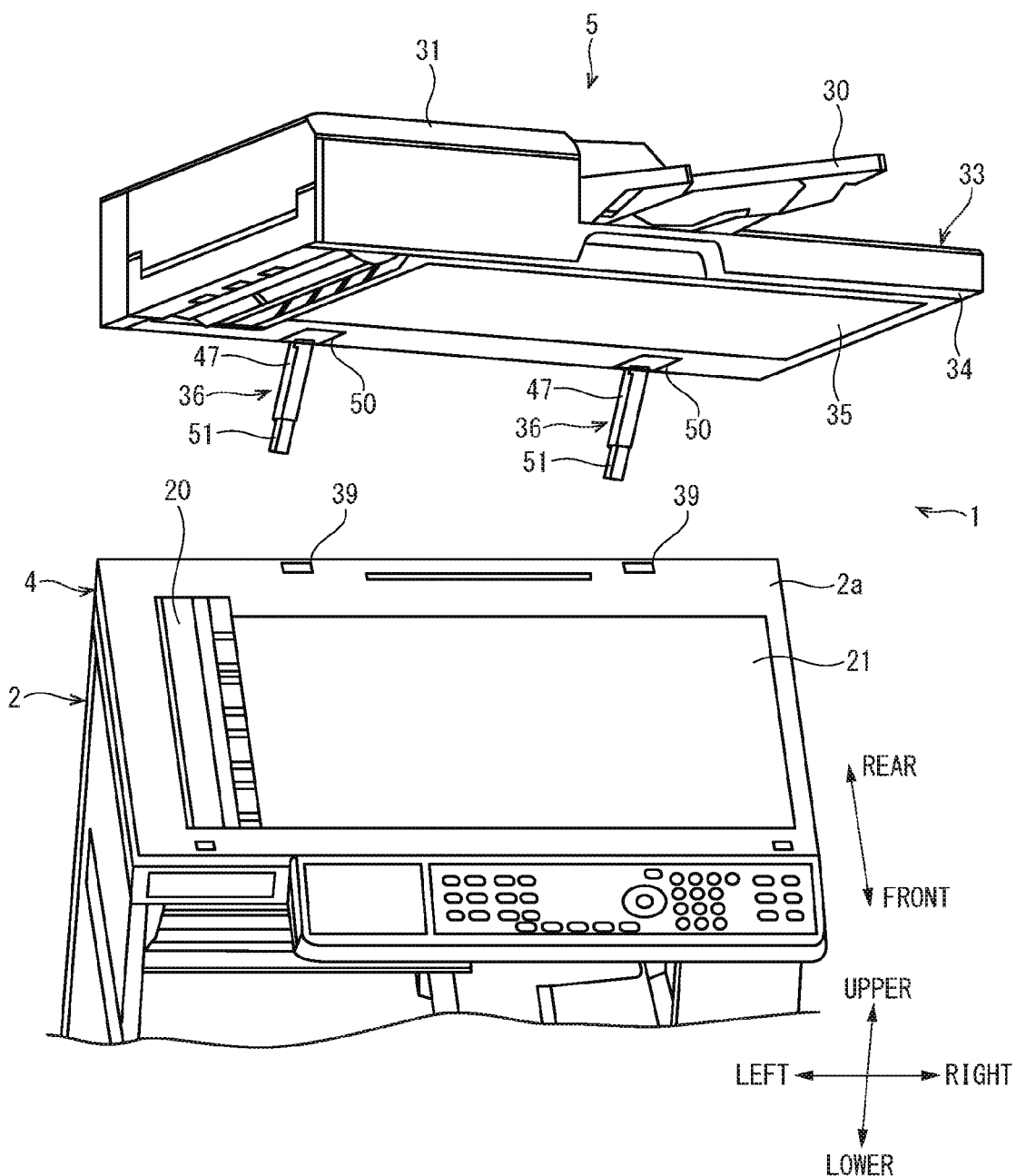
FIG. 2 is a perspective view showing the multifunction peripheral in a state that an auto document feeder is detached from the apparatus main body according to the embodiment of the present disclosure.

First, with reference to FIG. 1 and FIG. 2, a multifunction peripheral 1 that serves as an image forming apparatus according to an embodiment. Here, FIG. 1 is a sectional view schematically showing an internal structure of the multifunction peripheral 1. FIG. 2 is a perspective view showing a state that an auto document feeder 5 is detached from an apparatus main body 2.

The multifunction peripheral 1 is configured by storing an image forming device 3 and an image reading device 4 and others inside a roughly box-shaped apparatus main body 2 (housing). In addition, on an upper plate 2a of the apparatus main body 2 (refer to FIG. 2 and others), an auto document feeder 5 for automatically feeding a document S one by one into an image reading position H of the image reading device 4 is mounted.

The auto document feeder 5 (ADF: Auto Document Feeder) includes a feeding tray 30 on which the document S is placed, a conveyance mechanism 31 for feeding the document S into the image reading device 4 on the feeding tray 30, an ejecting tray 32 for receiving the document S after image reading and a document cover 33 for supporting the conveyance mechanism 31 and the ejecting tray 32.

The cover frame 34 is formed of a resin material together with exteriors of the conveyance mechanism 31 and the ejecting tray 32. The mat 35 is formed of an elastic resin material in a rectangular flat plate shape smaller than the cover frame 34. In a state that the document cover 33 is closed, in a rear part of a lower surface of the cover frame 34, a pair of left and right fitting attachment parts 50 are recessed. Specifically, the pair of left and right fitting attachment parts 50 are formed in a position in which the pair of left and right fitting attachment parts 50 can support the conveyance mechanism 31 and the ejecting tray 32, respectively. Into each of the fitting attachment parts 50, a supporting member 37 of respective hinge structures 36 described later is fitted.

The document cover 33 is attached on an upper surface of the apparatus main body 2 via the pair of left and right hinge structures 36 (refer to FIG. 2). In other words, the auto document feeder 5 is configured to rotate around a rotation axis of each of the hinge structures 36. In addition, the auto document feeder 5 is configured so that a contact glass 20 and a platen glass 21 are exposed by lifting a front surface side of the auto document feeder 5 up to pivot. When the document S is placed on the platen glass 21 and the auto document feeder 5 is closed, the document S is pressed by the mat 35 from the upper side.

Figure 3:
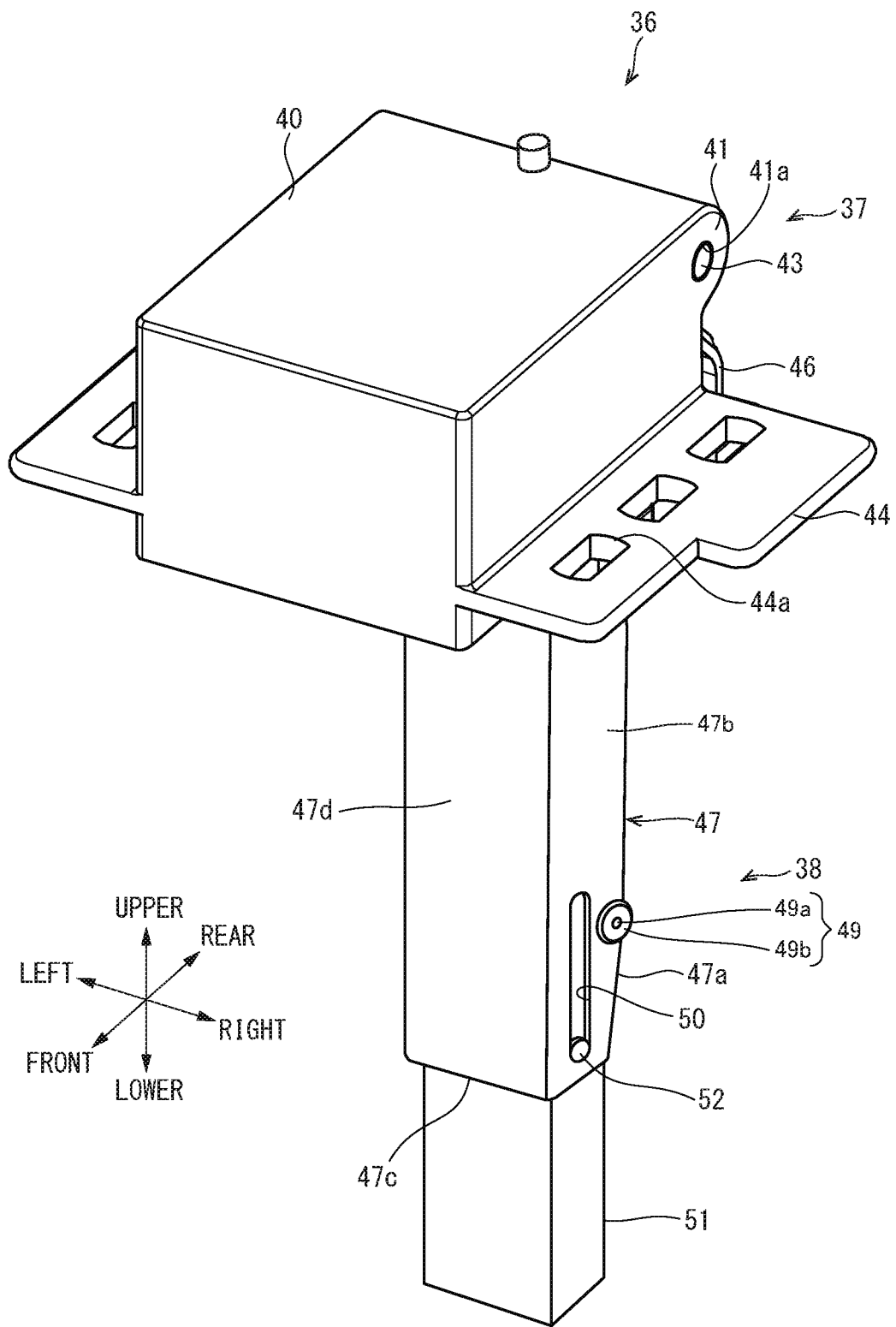
FIG. 3 is a perspective view showing a hinge structure according to the embodiment of the present disclosure.
Figure 4:
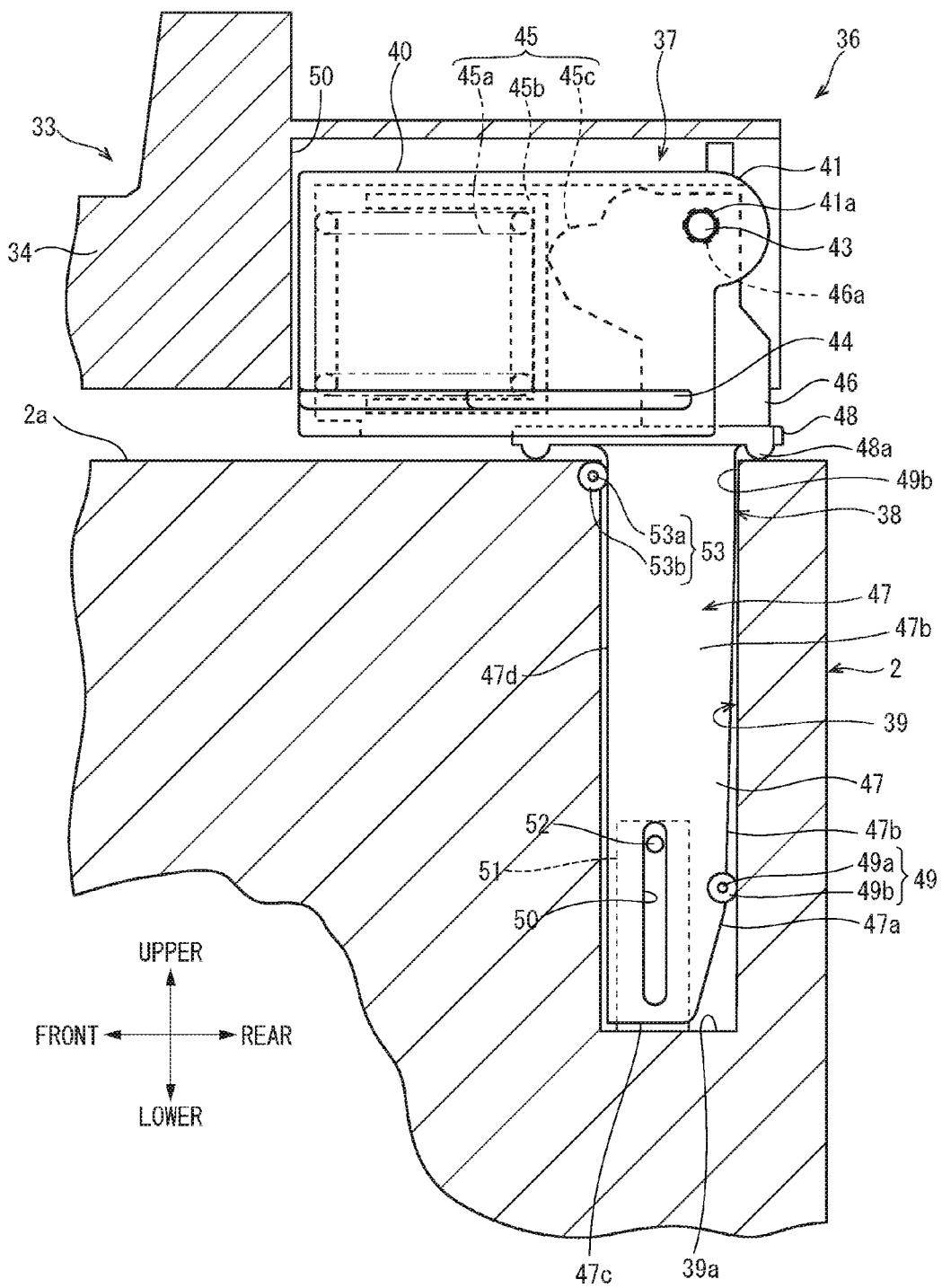
FIG. 4 is a side view of the hinge structure and a side cross sectional view showing a part of the apparatus main body and a document cover according to the embodiment of the present disclosure.

Next, with reference to FIG. 2 to FIG. 4, the hinge structures 36 according to the embodiment will be described in detail. FIG. 3 is a perspective view showing the hinge structures 36. FIG. 4 is a side view of the hinge structures 36 and a side cross sectional view showing a part of the apparatus main body 2 and the document cover 33. It is to be noted that, in the following description, a state that the document cover 33 (the auto document feeder 5) is closed is considered as a reference state.

The hinge structures 36 are to openably/closably support the document cover 33 (the auto document feeder 5) with respect to the platen glass 21. The hinge structures 36 are arranged apart from each other at a side of a rear surface (a lower surface) and along a back surface side of the cover frame 34. It is to be noted that the hinge structures 36 are provided in a left and right pair, but the respective hinge structures 36 have the same structure. Therefore, hereinafter, one of the hinge structures 36 will be described.

As shown in FIG. 2 to FIG. 4, the hinge structure 36 includes a supporting member 37 provided in the document cover 33, an attachment member 38 attachably/detachably provided in the apparatus main body 2 by a pivotable connection of an upper end part (one end part) to the supporting member 37, and an attachment recessed part 39 provided in a rear position of the platen glass 21 of the apparatus main body 2 so as to correspond to the attachment member 38.

The supporting member 37 includes a fitting part 40 formed in a roughly rectangular box shape, a rotational shaft part 43 provided between a pair of left and right shaft supporting plates 41 extending backward from a rear end of the fitting part 40, and a pair of left and right flange parts 44 protruded outside the fitting part 40.

As shown in FIG. 4, the fitting part 40 is hollowly formed. Within the fitting part 40, an assist mechanism 45 for assisting opening/closing of the document cover 33 (the auto document feeder 5) is built-in. The assist mechanism 45 includes a pair of left and right assist springs 45a (so-called coil springs) whose tip surface comes into contact with a front side inner surface of the fitting part 40, a spring supporting part 45b supporting each of the assist springs 45a, an assist cam 45c that comes into contact with a rear end surface of the spring supporting part 45b. When the supporting member 37 is upwardly pivoted, the rear end surface of the spring supporting part 45b is relatively moved along a cam surface of the assist cam 45c. Thereby, each of the assist springs 45a compressed is extended, and the extension force is utilized to assist opening of the document cover 33 (the auto document feeder 5).

The pair of left and right shaft supporting plates 41 are formed in a semi-disk shape as seen by a side view, respectively, and form the same plane as both of left and right side surfaces of the fitting part 40. In each of the shaft supporting plates 41, a shaft fixing hole 41a is formed so as to penetrate in the left and right directions. The rotational shaft part 43 is formed in a columnar shape and both of left and right end parts are press-fitted into the shaft fixing hole 41a of the pair of shaft supporting plates 41.

As well shown in FIG. 3, the pair of flange parts 44 are extended outwardly from a lowered position of left and right outer side surface of the fitting part 40, respectively. Each of the flange part 44 is formed in a flat plate. In each of the flange part 44, three fastening holes 44a are formed so as to penetrate the flange part 44 in the front and rear directions side by side. Into each of the fastening holes 44a, a thread (not shown) is inserted, the thread is fastened to each of the thread holes (not shown) of each of the fitting attachment parts 50 of the cover frame 34, whereby the supporting member 37 is attached to the document cover 33.

As shown in FIG. 3 and FIG. 4, the attachment member 38 includes a bearing part 46 provided integrally with the assist cam 45c and a leg part 47 extended downwardly from the bearing part 46.

As shown in FIG. 4, in the bearing part 46, the above-mentioned assist cam 45c is provided so as to protrude forward. In addition, a bearing hole 46a is formed so as to penetrate the bearing part 46 in the left and right directions, and into the bearing hole 46a, the above-mentioned rotational shaft part 43 is inserted. In other words, the rotational shaft part 43 supported by the pair of left and right shaft fixing holes 41a is shaft-supported by the bearing hole 46a. Thereby, the supporting member 37 is pivotably supported by the attachment member 38 around the rotational shaft part 43. In addition, in a lower part of the bearing part 46, an insertion restriction part 48 protruding outside in the front and rear and left and right directions is formed. It is to be noted that, on a lower surface of the insertion restriction part 48, a protrusion 48a protruding downwardly is formed.

As shown in FIG. 3 and FIG. 4, the leg part 47 of the attachment member 38 is formed hollowly and in a roughly prismatic shape. At a rear side of a lower part of the leg part 47, a tapered surface 47a chamfered obliquely is formed. At rear sides of lower parts of respective left and right side surfaces 47b of the leg part 47, attachment member side rollers 49 that serve as second rotating bodies in the vicinity of the upper end part of the tapered surface 47a are provided. Each of the attachment member side rollers 49 is constructed of a shaft part 49a protruded in the left and right side surfaces 47b and a rotating part 49b pivotably supported by the shaft part 49a. The rotating part 49b has a disk shape, and the surface thereof is formed of a resin material (rubber, nylon, urethane or the like), and is attached so as to contact with an inner surface of the rear side of the attachment recessed part 39. In addition, in a lower part of the left and right side surfaces of the leg part 47, a long hole 50 elongated vertically is drilled.

A lower end 47c of the leg part 47 of the attachment member 38 is opened, and an elastic member 51 is provided so as to extend from an inner part of the leg part 47 through the lower end 47c downwardly. The elastic member 51 is made of a rubber, for example, and is formed in a roughly prismatic shape thinner than the leg part 47, and a pin 52 is protruded so as to be engaged with the long hole 50 in the lower part on left and right side surfaces. Thereby, the elastic member 51 is ascended by an effect of external force upwardly to be stored inside the leg part 47 while the elastic member 51 is descended from the lower end 47c of the attachment member 38 by its own weight. In other words, the elastic member 51 can be smoothly and stably moved in a vertical direction.

The attachment recessed part 39 is formed downwardly from the upper plate 2a in a rear side of the apparatus main body 2. The attachment recessed part 39 is formed in a shape and size such that the leg part 47 of the attachment member 38 can be engaged, and as shown in FIG. 4, the elastic member 51 comes into contact with a bottom surface 39a of the attachment recessed part 39 and is stored inside the leg part 47 in a state that the document cover 33 is closed. Thereby, the elastic member 51 can be stored inside the attachment member 38 when the elastic member 51 is not used. This makes the size of the attachment recessed part 39 minimum. In an upper part of the attachment recessed part 39, an inlet/outlet part 39b is formed, and around a corner part of the front side of the inlet/outlet part 39b over the attachment recessed part 39, an apparatus main body side roller 53 that serves as a first rotating body is provided. The apparatus main body side roller 53 is constructed of a shaft part 53a extending in the left and right directions and a rotating part 53b pivotably supported by the shaft part 53a. The rotating part 53b has a cylindrical shape and a length corresponding to the width of the leg part 47 in the left and right directions, and a surface thereof is constructed of a resin material (rubber, nylon, urethane or the like), and is attached so as to contact with a front surface 47d of the leg part 47.

In a case in which the auto document feeder 5 including the hinge structures 36 having such a configuration is installed on the apparatus main body 2, first, as shown in FIG. 2, the auto document feeder 5 is moved above the apparatus main body 2 such that an angle between the supporting member 37 and the attachment member 38 of the hinge structures 36 is larger than 90°. In this time, the elastic member 51 is extended downwardly from the leg part 47 by its own weight.

Following this state, the auto document feeder 5 is descended with respect to the apparatus main body 2, the elastic member 51 is inserted into the attachment recessed part 39. Thereafter, the leg part 47 is inserted into the attachment recessed part 39, the attachment member side roller 49 contacts with the attachment recessed part 39 while rotating, and the apparatus main body side roller 53 contacts with the front surface 47d of the leg part 47 while rotating. In this time, the elastic member 51 formed to be thinner than the leg part 47 functions as a guide and the attachment member side roller 49 contacts with the attachment recessed part 39 while rotating and the apparatus main body side roller 53 contacts with the front surface 47d of the leg part 47 while rotating, respectively. This enables reduction of frictional resistance, thereby smoothly and easily carrying out insertion operation of the attachment member 38 into the attachment recessed part 39 with a compact configuration.

Further, when the insertion operation of the leg part 47 into the attachment recessed part 39 is proceeded, the insertion restriction part 48 (the protrusion 48a) of the attachment member 38 comes into contact with an upper surface of the apparatus main body 2 (the upper plate 2a), and the insertion of the leg part 47 into the attachment recessed part 39 is stopped (refer to FIG. 4). Thereby, the attachment of the auto document feeder 5 to the apparatus main body 2 is completed.

Next, with reference to FIG. 4 to FIG. 6, effects of the above-mentioned hinge structures 36 will be described. Here, FIG. 5 is a side view showing a state that a thick document D are pressed onto the platen glass 21 by the document cover 33, and FIG. 6 is a side view schematically showing a state that the attachment member 38 is lifted up.

Figure 5:
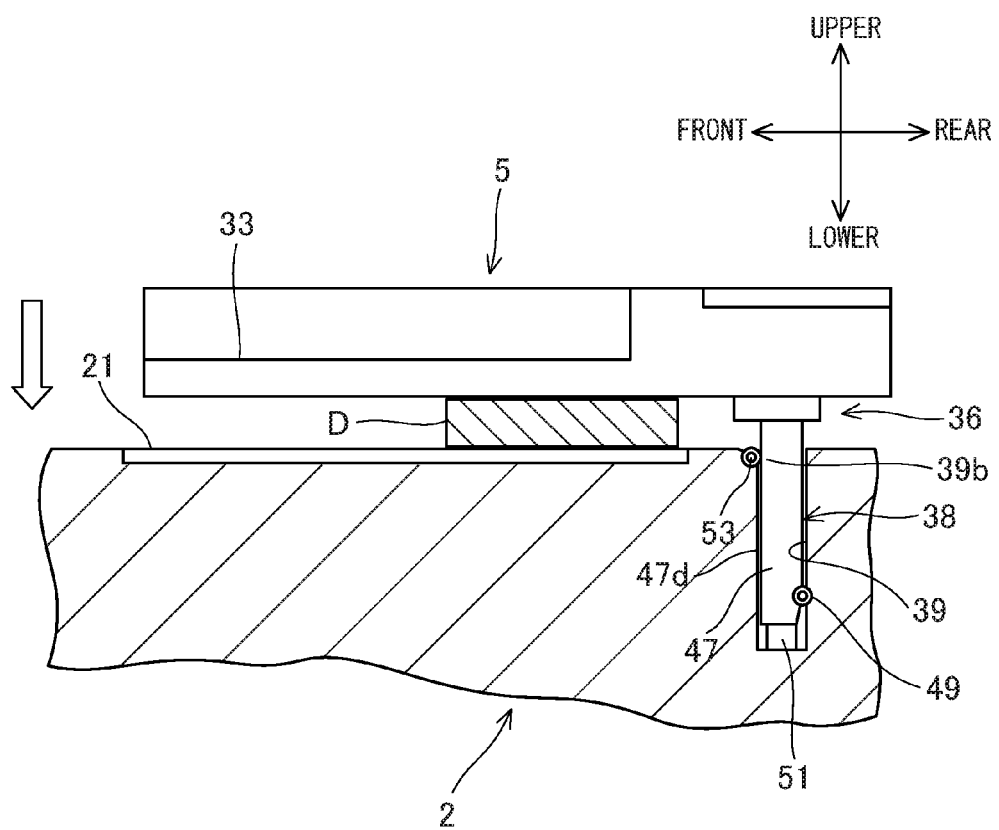
FIG. 5 is a side view schematically showing a state that a thick document is pressed onto a platen glass by the document cover in the multifunction peripheral according to the embodiment of the present disclosure.
Figure 6:
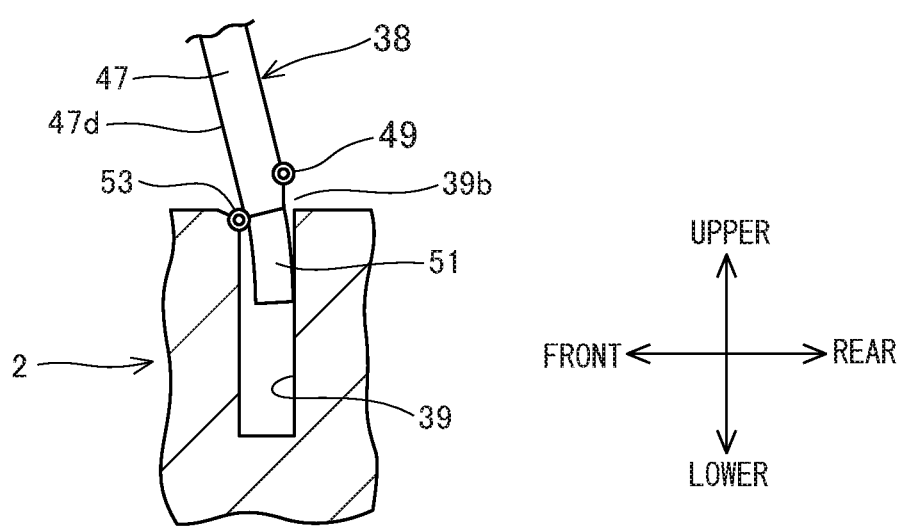
FIG. 6 is a side view schematically showing a state that an attachment member is lifted up in the hinge structure according to the embodiment of the present disclosure.

As shown in FIG. 5, in order to read the thick document D such as a book, when the document D is pressed to the platen glass 21 by the document cover 33, the attachment member 38 is ascended along the attachment recessed part 39 from a state that the lower end 47c of the leg part 47 is close to the bottom surface 39a of the attachment recessed part 39 (refer to FIG. 4), the elastic member 51 is protruded downwardly from the lower end 47c of the leg part 47 by its own weight. During this time, the apparatus main body side roller 53 contacts with the front surface 47d of the leg part 47 while rotating, and the attachment member side roller 49 contacts with the attachment recessed part 39 positioned in an opposite side (a rear side) in which the apparatus main body side roller 53 is set while rotating. Therefore, the leg part 47 is smoothly lifted up along the attachment recessed part 39 without prying the attachment recessed part 39, thereby preventing generation of defects such as breaking or deformation of the hinge structures 36.

On the other hand, in a case in which a document thicker than a defined limited thickness is pressed by the document cover 33, for example, due to a user's carelessness, there is a risk that the attachment member 38 is further lifted up and the leg part 47 gets out of the attachment recessed part 39. In addition, when the auto document feeder 5 is detached in order to carry out a periodical maintenance work, it is necessary that the leg part 47 of the attachment member 38 is pulled out of the attachment recessed part 39. In such a case, as shown in FIG. 6, the attachment member side roller 49 does not contact with the attachment recessed part 39. However, a state that the elastic member 51 extending from the lower end 47c of the leg part 47 by its own weight is gradually warped to contact with the attachment recessed part 39, and the apparatus main body side roller 53 contacts with the front surface 47d of the leg part 47 or the elastic member 51 is kept to the last. Therefore, impact due to acute detachment of the leg part 47 from the attachment recessed part 39 can be avoided, and generation of defects such as breaking or deformation of the hinge structures 36 can be prevented.

As described above, according to the hinge structures 36 and the multifunction peripheral 1 including the hinge structures 36 according to the embodiment of the present disclosure, even if the thick document D such as a book is strongly pressed onto the platen glass 21 by the auto document feeder 5, by effects of the attachment member side roller 49, the apparatus main body side roller 53 and the elastic member 51, a smooth operation can be realized. Therefore, opening/closing operations of the document cover can be smoothly operated, thereby enabling sure prevention of breaking or damage of the hinge structures 36. In addition, in this time, vertical movement of the leg part 47 of the attachment member 38 through the attachment recessed part 39 causes no abrasion and/or abrasion powder due to friction.

It is to be noted that, in the hinge structures 36 according to the embodiment described above, the apparatus main body side roller 53 that serves as a first rotating body has been used, and attachment member side roller 49 that serves as a second rotating body has been used, the present disclosure is not limited to these embodiments. In addition, the shape, size and number arranged of the rotating parts 49*b*, 53*b* are also not limited to these embodiments. In other words, instead of a roller, various alterations such as, for example, use of a roller having a roughly barrel shape and/or a so-called ball caster that is rotatable in all directions are possible.

Further, description of the embodiment of the present disclosure described above describes a suitable embodiment in the hinge structures 36 and the multifunction peripheral 1 including the hinge structures 36 according to the present disclosure. Therefore, the description may add technically preferred various limitations, but the technical scope of the present disclosure is not limited to these embodiments unless there is description particularly limiting the present disclosure. In other words, components in the embodiment of the present disclosure described above can be appropriately exchanged with existing components, and various variations including combinations with other existing components are possible. The description of the embodiment of the present disclosure described above does not limit the content of the disclosure described in claims.

What is claimed is:

1. A hinge structure for openably/closably supporting a document cover for pressing a document on a document mounting surface formed on an upper surface of an apparatus main body with respect to the document mounting surface, the hinge structure comprising:

an attachment recessed part formed downwardly in a position out of the document mounting surface on the upper surface of the apparatus main body, and configured to have an inlet/outlet part in an upper part thereof, an attachment member protruded downwardly from the document cover so as to be insertable into and removable from the inlet/outlet part of the attachment recessed part, and configured so that an upper end part thereof is pivotably connected to the document cover, a first rotating body configured to be provided at the document mounting surface's side of the inlet/outlet part of the attachment recessed part so as to come into contact with a leg part of the attachment member and a second rotating body configured to be provided in the leg part of the attachment member so as to come into contact with the attachment recessed part at an opposite side of the position in which the first rotating body is provided, and an elastic member configured to extend downwardly from a lower end of the attachment member.

2. The hinge structure according to claim 1, wherein the elastic member is configured to be storable inside the attachment member by an effect of external force upwardly.

3. The hinge structure according to claim 1, comprising:

a long hole formed on a side surface of the attachment member and configured to elongated vertically; and a pin configured to be protruded on a side surface of the elastic member so as to be slidable upwardly and downwardly along the long hole.

4. The hinge structure according to claim 1, wherein the first rotating body and the second rotating body are rollers.

5. An image forming apparatus comprising the hinge structure according to claim 1.

\* \* \* \* \*